(12) United States Patent
Sakuragi

(10) Patent No.: US 7,094,190 B2
(45) Date of Patent: Aug. 22, 2006

(54) TOOL POT

(75) Inventor: Satoshi Sakuragi, Aichi-ken (JP)

(73) Assignees: AOI Seiko Co., Ltd., Aichi-ken (JP); Toshihiro Goto, Aichi-ken (JP)

( * ) Notice: Subject to any disclaimer, the term of this patent is extended or adjusted under 35 U.S.C. 154(b) by 0 days.

(21) Appl. No.: 10/992,099

(22) Filed: Nov. 19, 2004

(65) Prior Publication Data

US 2005/0143238 A1    Jun. 30, 2005

(30) Foreign Application Priority Data

Dec. 25, 2003   (JP)   ............... 2003-430489

(51) Int. Cl.
*B23Q 3/157* (2006.01)
(52) U.S. Cl. .......................... 483/65; 483/59
(58) Field of Classification Search ................ 483/65, 483/59, 60, 58, 62, 61, 63, 64, 66, 67, 68, 483/901, 902; 81/900, DIG. 11; 220/62.11, 220/62.15, 62.22; 279/900
See application file for complete search history.

(56) References Cited

U.S. PATENT DOCUMENTS

| | | | |
|---|---|---|---|
| 5,018,915 A * | 5/1991 | Inokuma et al. ............ | 409/231 |
| 5,154,686 A * | 10/1992 | Klarer .......................... | 483/59 |
| D348,274 S | 6/1994 | Hallbach et al. | |
| 5,688,215 A | 11/1997 | Mase et al. | |
| 6,528,559 B1 * | 3/2003 | Nakacho et al. ............. | 524/116 |
| 6,620,083 B1 | 9/2003 | Ninomiya et al. | |
| 2002/0035019 A1 * | 3/2002 | Ninomiya et al. ............ | 483/59 |

FOREIGN PATENT DOCUMENTS

| | | |
|---|---|---|
| EP | 1162027 | 12/2001 |
| GB | 2149696 | 6/1985 |
| JP | 2001-347434 | 12/2001 |
| JP | 2002-273633 | 9/2002 |

* cited by examiner

*Primary Examiner*—Boyer D. Ashley
*Assistant Examiner*—Dana Ross
(74) *Attorney, Agent, or Firm*—Armstrong, Kratz, Quintos, Hanson & Brooks, LLP

(57) ABSTRACT

A tool pot according to the present invention includes an inner wall structure and an outer wall structure that constitute a circumferential wall of a tool attachment hole of the tool pot. The inner wall structure is located at least toward an opening end of the attachment hole and in inner side, and the outer wall structure is located around the inner wall structure. The inner wall structure and outer wall structure are both made from thermo-plastic resin, and the outer wall structure contains more reinforcing filler than the inner wall structure. The tool pot of the present invention prevents damages to tools, and is recyclable.

7 Claims, 8 Drawing Sheets

TOOL POT

The present application claims priority from Japanese Patent Application No. 2003-430489 of Sakuragi, filed on Dec. 25, 2003, the disclosure of which is hereby incorporated into the present application by reference.

BACKGROUND OF THE INVENTION

1. Field of the Invention

The present invention relates to a tool pot used for a tool magazine of a machine tool, and more particularly, to a tool pot made from synthetic resin, whose circumferential wall has a two-layer construction of an inner wall structure located at least toward an opening end of an attachment hole and in inner side, and an outer wall structure located around the inner wall structure.

2. Description of the Related Art

In the prior art, Japanese Laid-Open Patent No. 2002-273633 discloses a tool pot made from synthetic resin and having two-layer construction. An inner wall of the tool pot is made from heat-hardening resin such as phenolic resin, and an outer wall located around the inner wall is made from thermo-plastic resin such as ABS resin containing reinforcing filler such as glass fiber.

Japanese Laid-Open Patent No. 2001-347434 discloses a tool pot having a single layer construction that is entirely molded from thermo-plastic resin such as ABS resin containing reinforcing filler such as glass fiber.

In the former tool pot of two-layer construction, the inner wall of heat-hardening resin cannot be melted and recycled together with the outer wall of thermo-plastic resin.

In the latter tool pot of single layer construction, the inner part of a tool attachment hole has rigidity, too. Accordingly, if a tool is dislocated from an exact inserting position when inserted into the attachment hole, the tool is liable to contact the tool pot unexpectedly and be damaged by the tool pot.

SUMMARY OF THE INVENTION

The present invention contemplates to solve the above mentioned problems, and therefore, has an object to provide a tool pot capable of preventing damages to tools, and is recyclable.

A circumferential wall of a tool attachment hole of the tool pot according to the present invention is made from synthetic resin. The circumferential wall includes an inner wall structure located at least toward an opening end of the attachment hole and in inner side, and an outer wall structure located around the inner wall structure. The inner wall structure and outer wall structure are made from thermo-plastic resin, and the outer wall structure contains more reinforcing filler than the inner wall structure.

Since the inner wall structure contains less reinforcing filler than the outer wall structure, and thus has lower rigidity, strength and hardness, the inner wall does not damage tools even if it contacts with the tools. In the meantime, the outer wall structure containing more reinforcing filler than the inner wall has increased rigidity, and therefore, is capable of preventing the inner wall from being deformed, and is durable as tool holder.

Moreover, since both the inner and outer wall structure are made from thermo-plastic resin material, both of them can be melted and recycled.

Therefore, the tool pot of the present invention prevents damages to tools, and is recyclable.

Here, thermoplastic resin material is exemplified by ABS resin, polyacetal, polyamide, polystyrene, or polycarbonate or the like, and reinforcing filler is exemplified by glass fiber, carbon fiber, mica, or calcium carbonate or the like.

It is desired that a content of reinforcing filler of the inner wall structure is less than 5 weight %, and a content of reinforcing filler of the outer wall structure is within a range of 5 to 60 weight %.

With this composition, damaging of tools by the inner wall structure is securely prevented, and strength of the outer wall structure is sufficiently assured. Furthermore, thermoplastic resin materials forming the inner and outer wall structure are easily available as recycled material. Therefore, manufacturing cost of the tool pots can be remarkably reduced to ¼ to ⅕. Especially, if the content of reinforcing filler of the outer wall structure is in a range of 15 to 60 weight %, the outer wall is light-weight and compact, while keeping sufficient strength, and therefore, practical tool pots are provided.

If the inner wall structure and outer wall structure are made from the same thermo-plastic resin material, when the tool pot is recycled, the tool pot is labeled as is wholly made from the same material, which facilitates the labeling of recycling, compared to a case where the inner wall and outer wall are made from different thermo-plastic materials. In addition, when the pots are heat-treated to be molten, the recycling treatment is facilitated since the whole pot is melted at the same melt-temperature.

It will also be appreciated that the outer wall structure is substantially columnar in outer shape, and includes a plurality of ribs for reinforcement in inner surface thereof.

With this construction, the tool pot does not have reinforcing ribs on outer surface of the outer wall, so that an outer side of the outer wall has a substantially columnar shape with smooth face. Accordingly, when tools are exchanged, the tool pot is accurately shifted to match with a center of a positioning face of a positioning device, without hindrance of ribs, by applying the positioning face, which is so arcuate as to correspond to the outer side of the outer wall, to the outer side of the outer wall. Therefore, the tool pot is easily and accurately located in a predetermined stop position utilizing the outer side of the outer wall having a substantially columnar shape. Although applying direction of the positioning face of the positioning device may vary due to change of location of the positioning device and so on, the positioning face can be applied to the outer side of the outer wall from any circumferential direction of the tool pot, since the outer side of the outer wall has a substantially columnar shape. This facilitates positioning of the tool pot. Of course, the ribs contribute to weight reduction and reinforcement of the tool pot.

In this case, the reinforcing ribs are desirably arranged along axial direction of the outer wall. With this construction, the ribs are molded easily without utilizing slide core and so on.

It will also be appreciated that the inner wall structure includes a first tapered inner surface located toward an opening end of the tool attachment hole and so tapered toward the opening end of the attachment hole as to correspond to a shank portion of a tool inserted into the attachment hole, thereby the shank portion abuts against and is supported by the tapered inner surface, and that the outer wall structure includes a second tapered inner surface defining a deeper side of the attachment hole, and the second tapered surface does not abut against the shank portion.

With this construction, the inner wall can be arranged to accommodate various tools only by exchanging the inner wall. For example, if a shape of shank portion of a tool to be housed in the tool pot is changed, the inner wall has only to be exchanged while leaving the outer wall as it is. Therefore, the tool pot can handle various kinds of tools with simple exchanging work of the inner wall.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
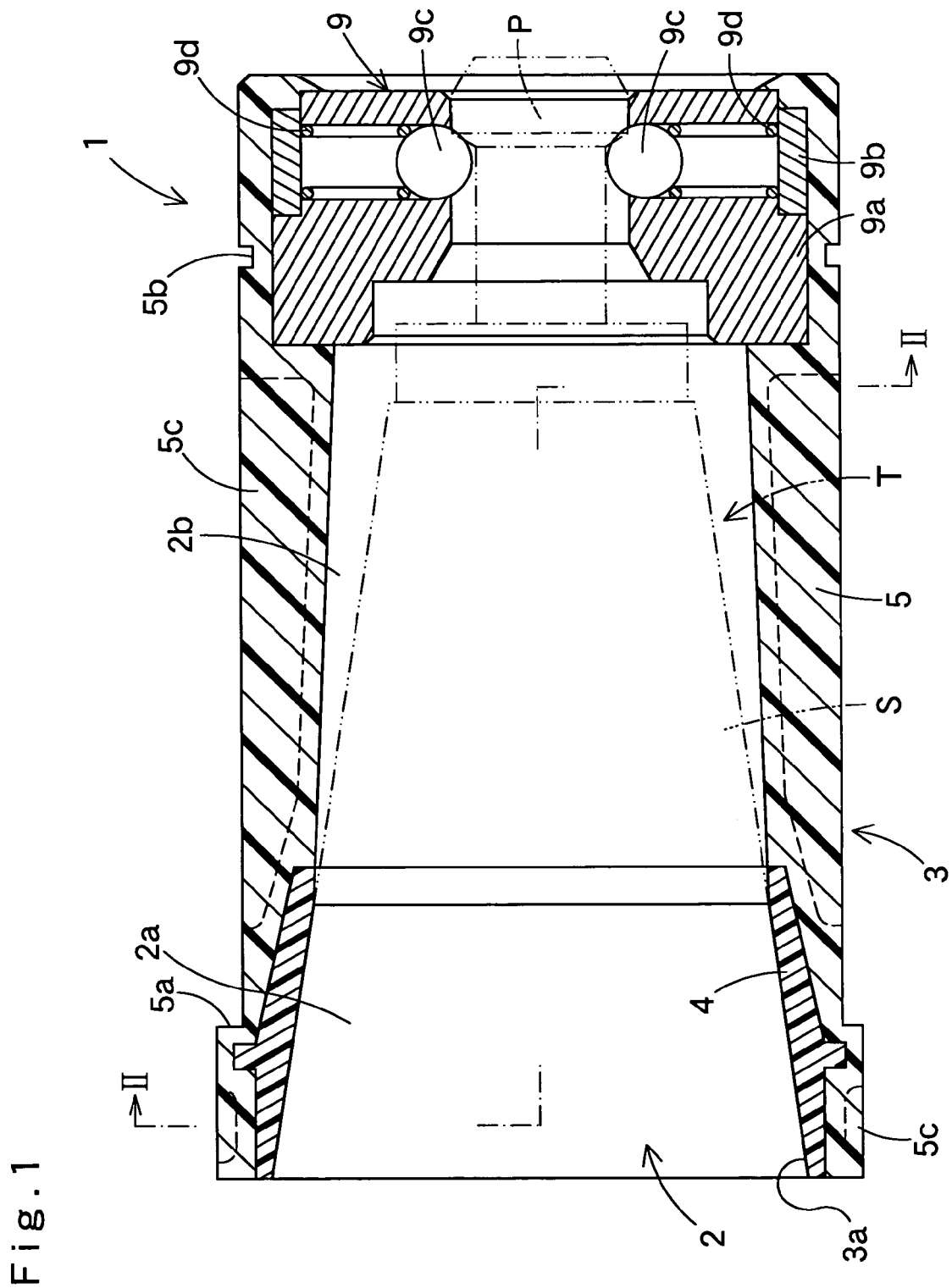
FIG. 1 is a vertical section of a tool pot according to a first embodiment of the present invention.
Figure 2:
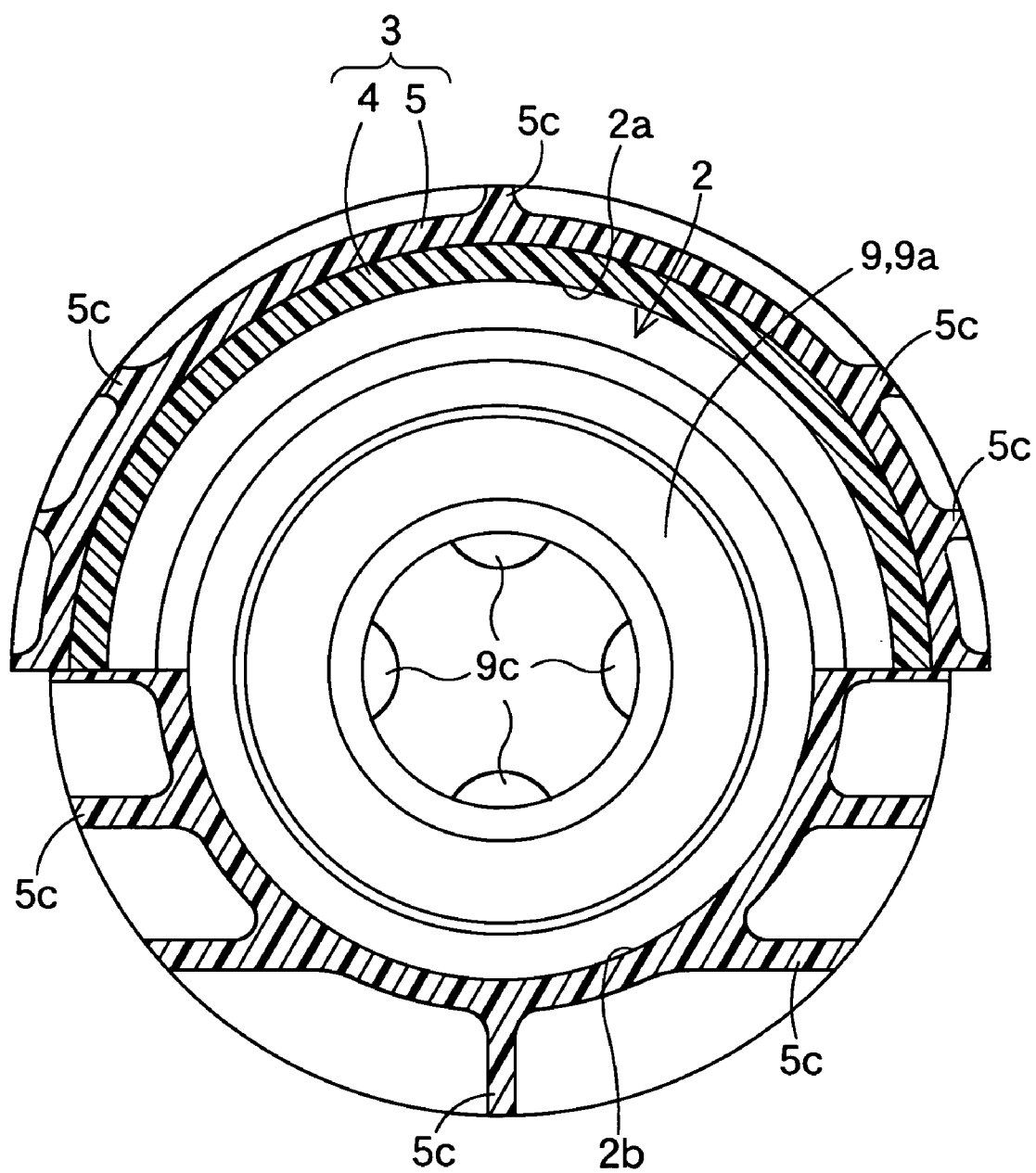
FIG. 2 is a vertical section of the tool pot of FIG. 1 taken along line II—II in FIG. 1.
Figure 3:
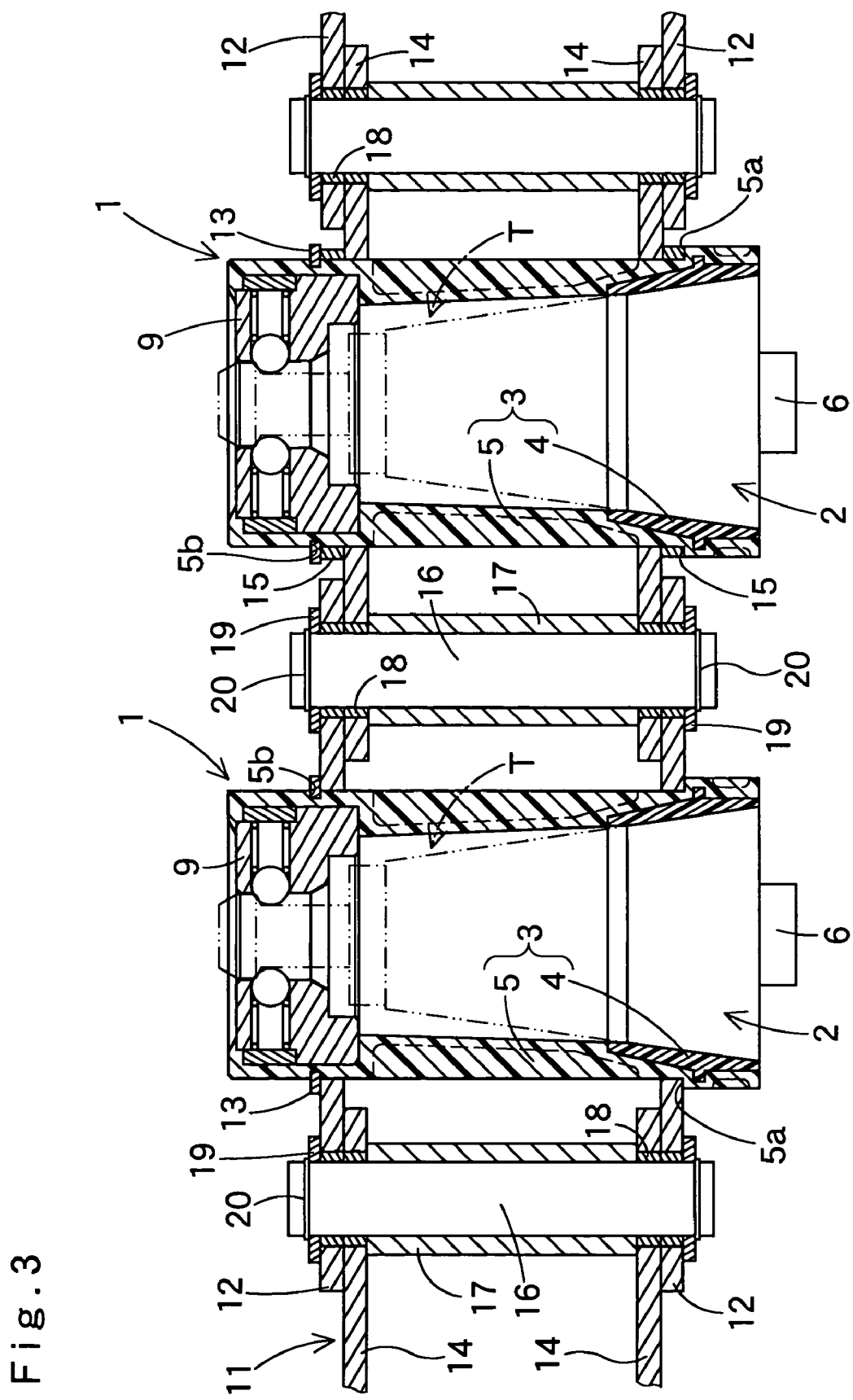
FIG. 3 is a vertical section of the tool pots of FIG. 1 held by a holding mechanism.
Figure 4:
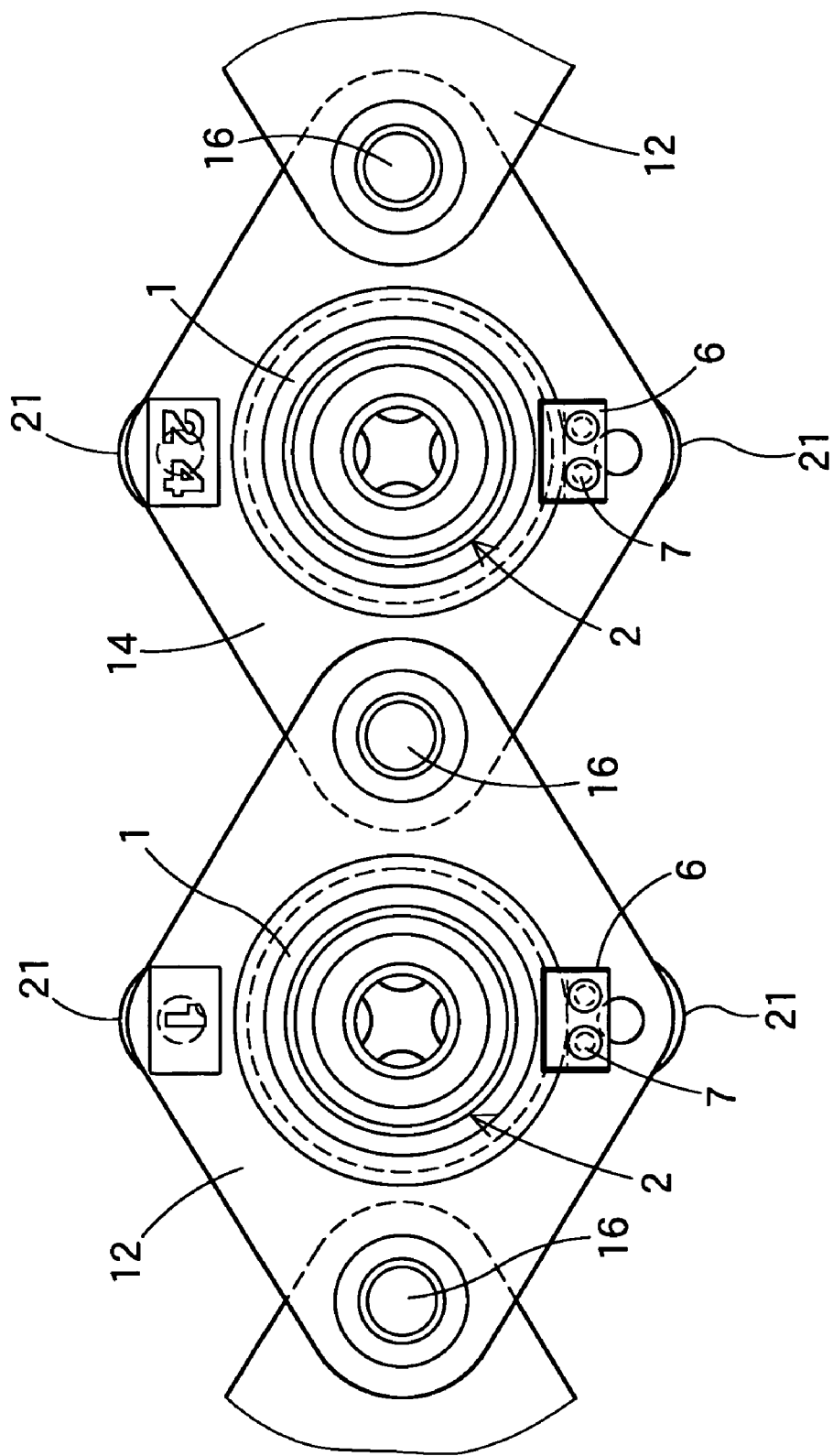
FIG. 4 is a side view of the tool pots of FIG. 1 held by a holding mechanism.

FIGS. 1 and 2 illustrate a tool pot 1 according to a first embodiment of the invention. Numbers of tool pot 1 are held in a chain 11 as a pot retention mechanism of a tool magazine, as shown in FIGS. 3 and 4.

The chain 11 includes pairs of outer plates 12 and inner plates 14 connected with one another by pins 16 sheathed with collars 17. The pins 16 and collars 17 help separate the pairs of inner plate 12 and outer plate 14 each of which confronts each other at predetermined clearance. Each of the tool pots 1 is located to penetrate the opposing plates 12 or 14, and is held in the chain 11 by a step 5a formed on outer surface of outer wall structure 5 and a holding ring 13 fitted in a groove 5b. In each of the inner plates 14, a spacer 15 helps hold the tool pot 1. Each of the pins 16 is fixed between the plates 12 or plates 14 by washers 19 located in both ends, which are held by holding rings 20. A member represented by reference numeral 18 is a bushing disposed between the plate 12 or 14 and the pin 16.

The chain 11 is provided, at both ends of a direction perpendicular to line-up direction of the pins 16 in each of the plates 12/14, with rollers 21 supported by bearings. The rollers 21 are engaged with unillustrated driving and driven sprockets of the tool magazine, and drive the chain 11 cyclically by the driving sprockets.

Each of the tool pots 1 has a tool attachment hole 2 in which shank portion S and pull-stud P of a tool T is inserted. A circumferential wall 3 of the attachment hole 2 forms a substantially cylindrical shape, and is provided with a tapered portion 2a tapering toward an opening end 3a according to the shape of a shank portion S of the tool T, and a tapered portion 2b tapering more gradually in deeper side.

The circumferential wall 3 includes an inner wall structure 4 located in a leading end part of the tool pot 1 and in inner side of the tapered portion 2a, and an outer wall structure 5 located around the inner wall structure 4 and the tapered portion 2b in the deeper side. At the bottom of the attachment hole 2 is a tool gripping mechanism 9 for holding the tool T by gripping the pull-stud P. In the illustrated embodiment, when a tool T is held in the tool pot 1, the shank portion S abuts against an inner surface (tapered portion) 2a in the opening end 3a part, but does not abut against an inner surface (tapered portion) 2b of the outer wall structure 5.

The tool gripping mechanism 9 includes a metal block 9a and four balls 9c disposed inside the metal block 9a. Each of the balls 9c is constructed to move centrally of the attachment hole 2 by coil springs 9d, and the four balls 9c cooperatively grip the inserted pull-stud P of the tool T to hold the tool T with the shank portion S abutted against the inner surface (tapered portion) 2a of the inner wall structure 4. A member represented by reference numeral 9 is a holding ring for supporting an end of the coil spring 9d.

The inner wall structure 4 and outer wall structure 5 of the circumferential wall 3 are both injection molded from thermo-plastic resin. The outer wall structure 5 contains more reinforcing filler than the inner wall structure 4. In the foregoing embodiment, the outer wall structure 5 is molded from polyamide (more particularly, Nylon 66) containing 30 weight % of glass fiber as reinforcing filler, while the inner wall structure 4 is molded from polyamide (Nylon 66) containing no reinforcing filler. The outer wall structure 5 is provided in outer surface thereof with numbers of ribs 5c for enhancing rigidity.

To manufacture the tool pot 1, a pre-molded inner wall 4 and the tool gripping mechanism 9 are set in a mold for forming the outer wall 5 as inserts, the mold is closed, and then the outer wall structure 5 is injection molded.

Since the inner wall structure 4 contains less reinforcing filler than the outer wall structure 5, and thus has lower rigidity, strength and hardness, the inner wall 4 does not damage tools T even if it contacts with the tools T. In the meantime, the outer wall structure 5 containing more reinforcing filler than the inner wall 4 has improved rigidity, and therefore, is capable of preventing the inner wall 4 from being deformed, and holding tools T with durability.

Moreover, since both the inner wall 4 and outer wall 5 are made from thermo-plastic resin material, both of them can be melted and recycled.

Therefore, the tool pot 1 of the first embodiment of the invention prevents damages to tools T, and is recyclable.

In the foregoing embodiment, content of glass fiber of the inner wall 4 is 0 weight %, which is less than 5 weight %, while content of glass fiber of the outer wall 5 is 30 weight %, which is within a range of 5 to 60 weight %. With this composition, damaging of tools T by the inner wall 4 is securely prevented, and strength of the outer wall 5 is sufficiently assured. Furthermore, thermo-plastic resin materials forming the inner wall 4 and outer wall 5 are easily available as recycled material. Therefore, manufacturing cost of the tool pots 1 can be remarkably reduced to ¼ to ⅕.

Moreover, in the foregoing embodiment, the inner wall 4 and outer wall 5 are made from the same thermo-plastic resin material, or polyamide. Accordingly, when the tool pot 1 is recycled, the tool pot 1 is labeled as is wholly made from the same material, which facilitates the labeling of recycling, compared to a case where the inner wall and outer wall are made from different thermo-plastic materials. In addition, when the pots 1 are heat-treated to be molten, the recycle treatment is facilitated since the whole pot is melted at the same melt-temperature.

Without considering above-described viewpoint, the inner wall 4 and outer wall 5 may be molded from different thermo-plastic resin materials. In this case, if melting points of two materials are substantially the same, the two materials are easily recycle-treated at the same melt-temperature. Of course, melting points of two materials may be different. Moreover, thermo-plastic resin material employed in this embodiment should not be limited to polyamide, but ABS resin, polyacetal, polystyrene, or polycarbonate may also be employed.

Although the inner wall 4 in the foregoing embodiment contains no reinforcing filler such as glass fiber, the thermo-plastic resin material for the inner wall 4 may contain less than 5 weight % of reinforcing filler, since damaging to tools T is prevented if the content of reinforcing filler is less than 5 weight %. Of course, reinforcing filler should not be limited to glass fiber, but carbon fiber, mica, or calcium carbonate may also be employed.

Although the outer wall 5 in the foregoing embodiment contains 30 weight % of reinforcing filler, the content has only to be within a range of 5 to 60 weight % (more desirably, 15 to 60 weight %). If it is less than 5 weight %, strength sufficient to prevent deformation of the inner wall 4 is not secured. If the content exceeds 60 weight %, molding of the outer wall 5 is difficult.

Moreover, the inner wall structure 4 is arranged only toward the opening end 3*a* in an inner circumference of the circumferential wall 3, the inner wall structure 4 may be arranged substantially all over the inner circumference of the circumferential wall 3.

Although the tool pot 1 in the first embodiment is provided with the ribs 5*c* on outer surface of the outer wall 5, the tool pot may be provided with ribs in inner surface of the outer wall, as a tool pot 31 of a second embodiment of the present invention shown in FIGS. 5 to 9. An outer wall structure 32 of the tool pot 31 is located around an inner wall structure 4, which is arranged only toward an opening end 3*a* of a circumferential wall 3, and also constitutes a deeper side of inner surface of a tool attachment hole 2 than the inner wall structure 4. The outer wall structure 32 is substantially columnar in outer shape, and includes in inner surface thereof with a plurality of (12, in the illustrated embodiment) reinforcing ribs 37 arranged in axial direction of the outer wall 32. Leading end faces 37*b* of the ribs 37 provide a tapered portion 2*b* that is located in deeper side of the attachment hole 2 than a tapered portion 2*a* provided by the inner wall 4. Meanwhile, end faces of the ribs 37 oriented toward the opening end 3*a* provide a recess 37*a* for fixing the inner wall 4 whose inner diameter and outer diameter diverge toward the opening end 3*a* therein.

The ribs 37 continue to a substantially cylindrical flange portion 33 arranged around the outer wall 32 near the opening end 3*a*, and also continue to a cylindrical bottom portion 38 in root side away from the opening end 3*a*. That is, both axial ends of the ribs 37 are joined with one another in circumferential direction of the outer wall 32.

The inner wall 4 of the tool pot 31 is made from polyamide (more particularly, Nylon 66) containing no reinforcing filler, while the outer wall 32 is made from polyamide (Nylon 66) containing 30 weight % of glass fiber as reinforcing filler, as in the tool pot 1. At the bottom of the attachment hole 2 is a tool gripping mechanism 9 as that of the tool pot 1. The tool pot 31 is manufactured by joining the separately molded inner wall 4 and the outer wall 32 by adhesive, vibration welding or the like. The tool pot 31 holds a tool T by gripping a pull-stud P with balls 9*c* of the tool gripping mechanism 9, with a shank portion S abutted against and supported by the inner surface 2*a* of the inner wall 4.

Figure 5:
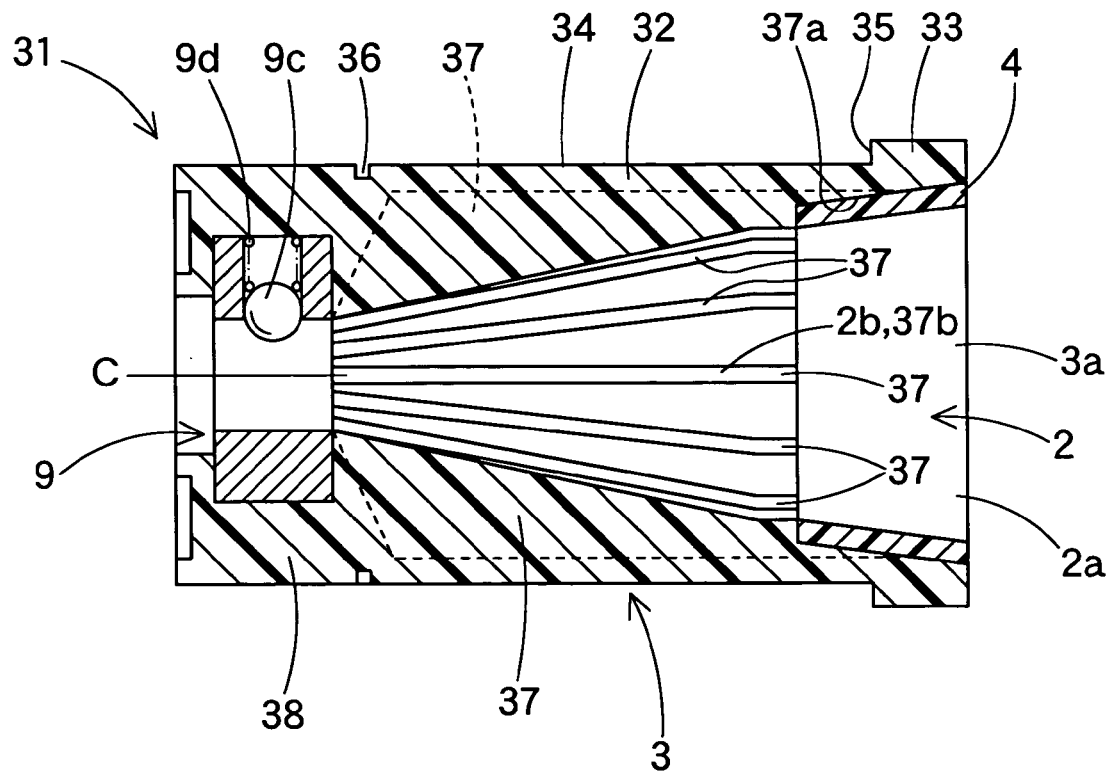
FIG. 5 is a vertical section of a tool pot according to a second embodiment of the present invention, taken along line V—V of FIG. 6.
Figure 6:
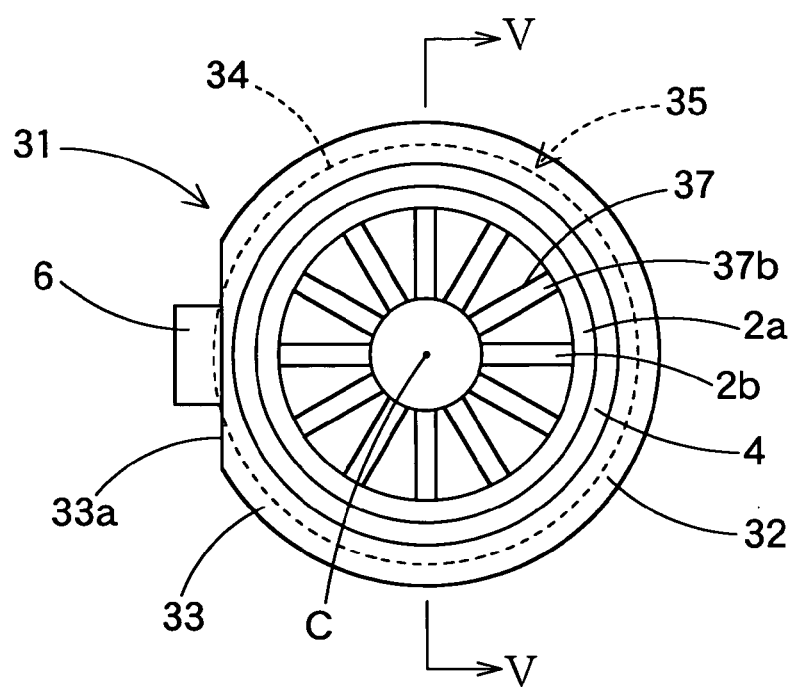
FIG. 6 is a side view of the tool pot of FIG. 5.
Figure 8:
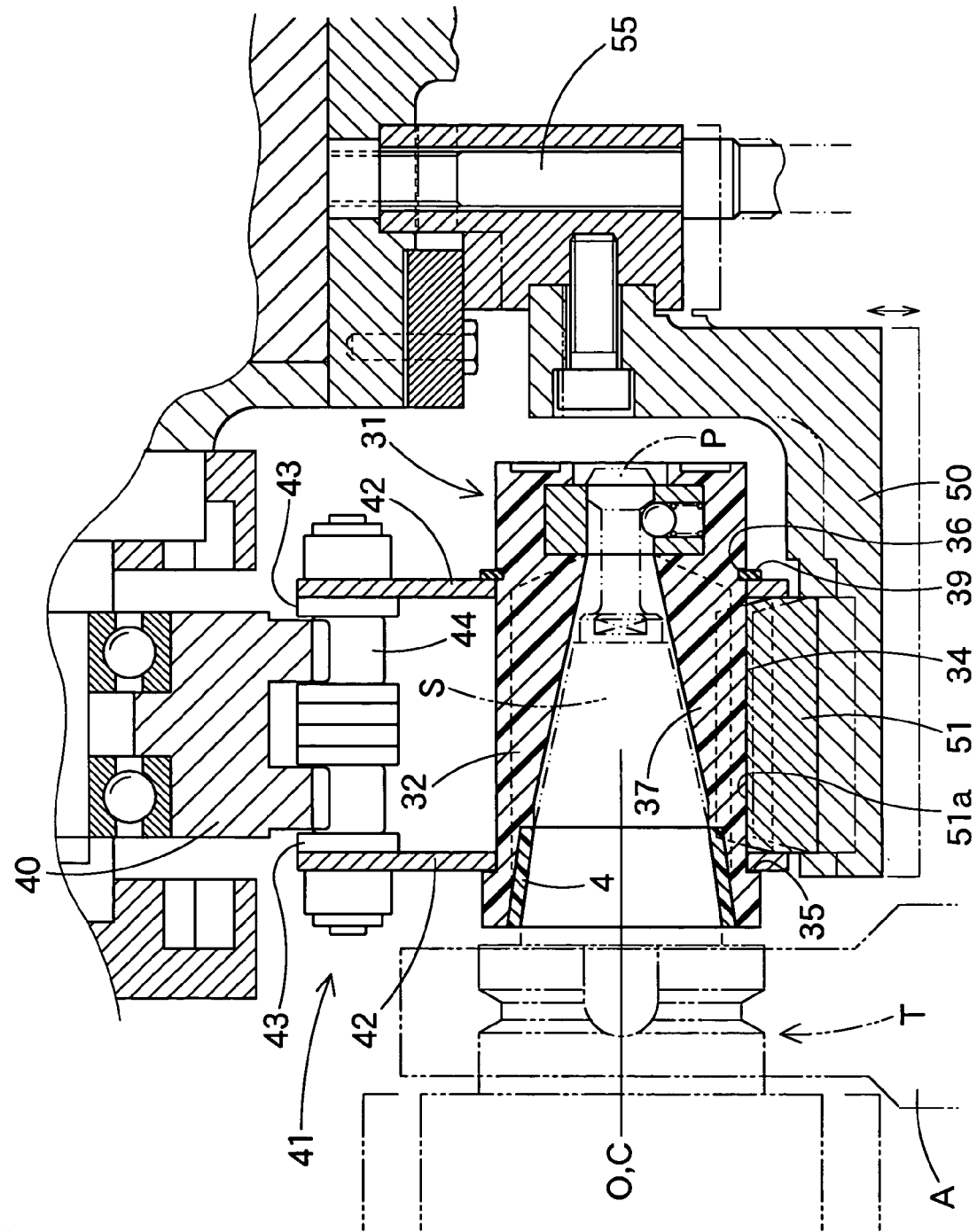
FIG. 8 is a schematic vertical section of the tool pot of FIG. 5 held by the holding mechanism and stopped by the positioning device.

Referring to FIGS. 5, 6 and 8, an outer side 34 of the outer wall 32 has a cylindrical shape except in the flange portion 33 and in a groove 36, thereby having a circular section. Center C of the cylindrical outer side 34 is predetermined to conform with a center of the shank portion S of the tool T as housed in the tool pot 31.

The flange portion 33 has a greater diameter than the outer side 34 by a step 35, and is provided with a flat portion 33*a* for locating a key 6.

The groove 36 located in a root part of the outer side 34 helps attach the tool pot 31 to a chain 41 as a pot holding mechanism, together with the step 35. More particularly, the tool pot 31 is attached to the chain 41 by applying the step 35 to one of confronting outer plates 42 of the chain 41 extending from both ends of each of rollers 44 engaged with a sprocket 40, and applying a holding ring 39 fitted in the groove 36 to the other plate 42.

Figure 7:
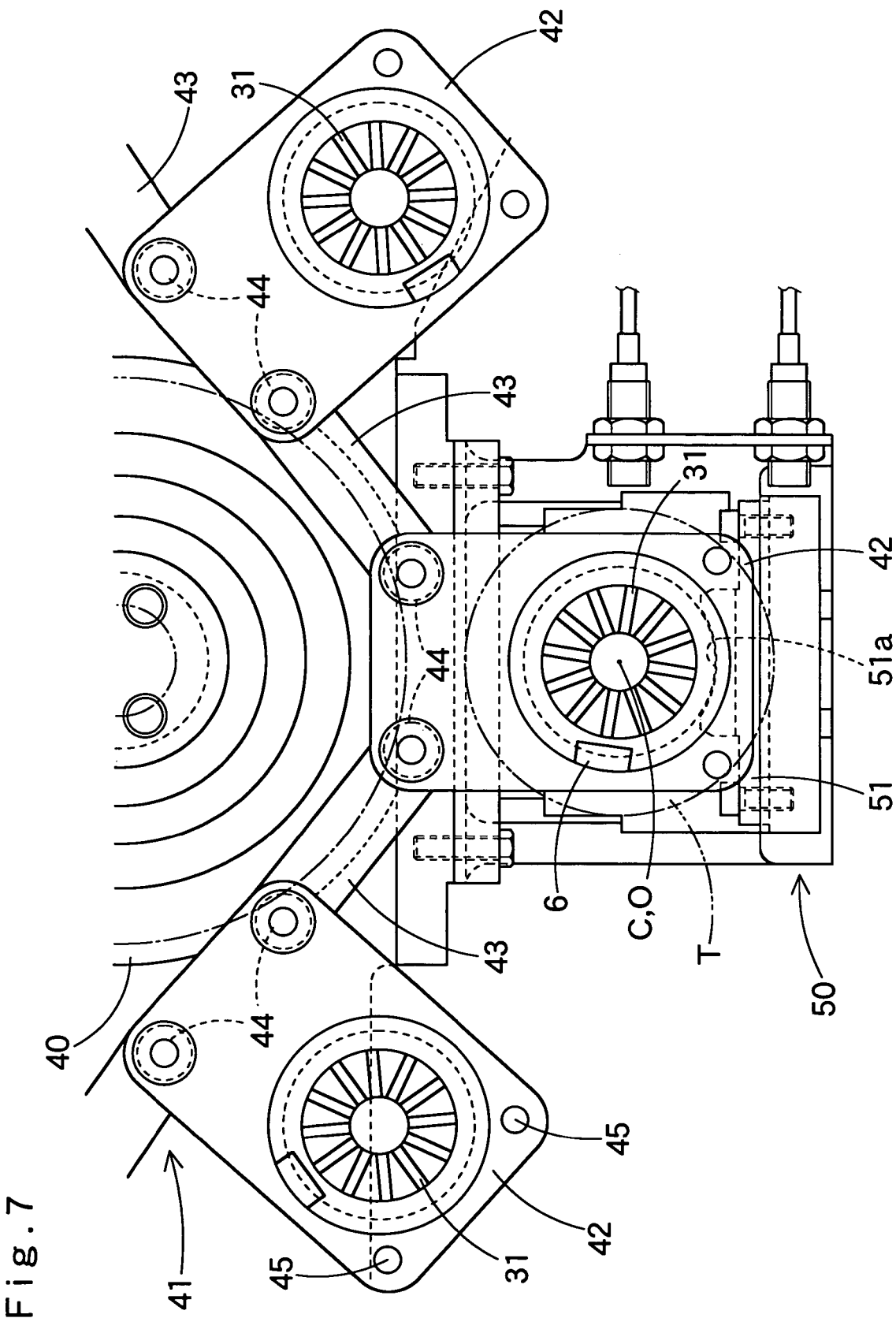
FIG. 7 is a schematic side view of the tool pot of FIG. 5 held by a holding mechanism and stopped by a positioning device.

Referring to FIGS. 7 and 8, the chain 41 in the illustrated embodiment includes numbers of pairs of confronting outer plates 42 each connected by two rollers 44 engaged with the sprocket 40 and two tie rods 45, and inner plates 43 joining pairs of outer plates 42 that are adjacent one another in a direction perpendicular to the axis of the roller 44.

Below a track of the tool pots 31 transferred by cyclical driving of the chain 41 is a positioning device 50, as shown in FIGS. 7 and 8, on which an arm A of a robot takes out a tool T from the tool pot 31 and returns a used tool T. The positioning device 50 is linked with a piston rod 55 reciprocating vertically, and a positioning block 51 is fixed above the positioning device 50. The positioning block 51 includes a positioning face 51*a* recessed in quarter arcuate shape corresponding to generally quarter outer shape of the outer side 34 of the outer wall 32 of the tool pot 31.

Center O of curvature radius of the positioning face 51*a* as risen to uppermost position is called herein as base position O (refer to FIGS. 7, 8 and 9B) for the arm A of the robot to exchange tools T. Exchange of tools T is performed with the center C of the tool pot 31, which conforms with a center of the shank portion S of the tool T held by the tool pot 31, matched with the center O. When the positioning face 51*a* descends to lowermost position, the positioning block 51 does not interfere with the tool pots 31 transferred by the chain 41.

Figure 9A:
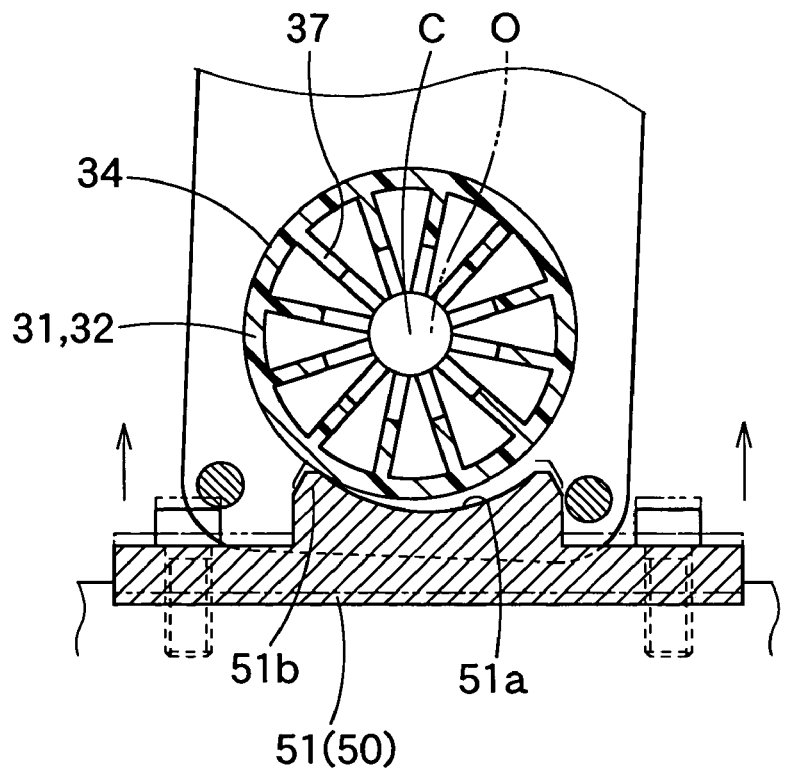
FIGS. 9A and 9B illustrate the tool pot of FIG. 5 being positioned by the positioning device in order.
Figure 9B:
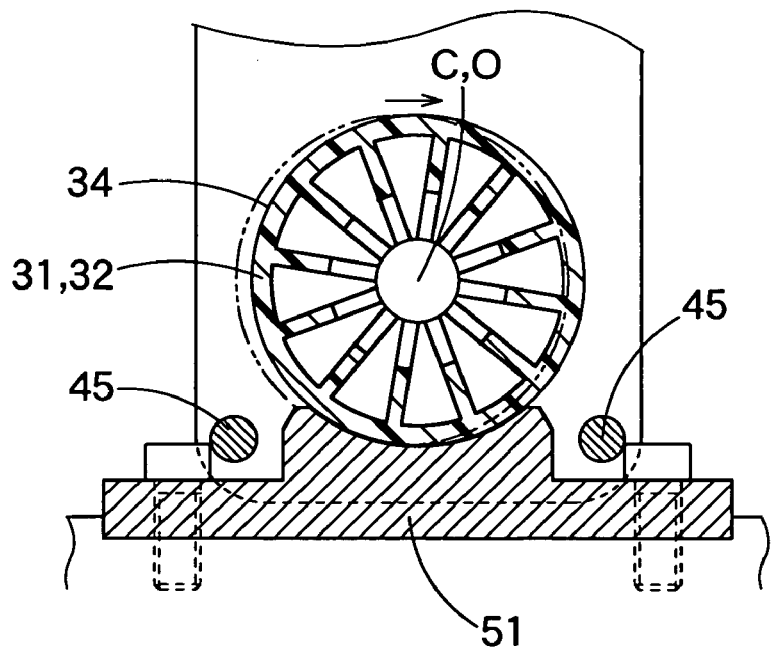

When the driving of the chain 41 stops for exchanging tools T, the center C of the tool pot 31 may not conform with the exchange base position O at first. In the foregoing embodiment, in that case, when the positioning block 51 of the positioning device 50 ascends toward the uppermost position, a part of the outer side 34 of the outer wall 32 in the tool pot 31 contacts with the positioning face 51*a* firstly, as shown in FIG. 9A, and then the tool pot 31 is guided by the positioning face 51*a* along with ascent of the positioning face 51*a*, and matches the center C with the base position O, as shown in FIG. 9B. Here, it is plays or the like of the driving or driven sprockets 40 and the chain 41 that cause a gap between the center C and the base position O.

When the center C of the tool pot 31 and the base position O match each other, the tool pot 31 is ready for the arm A of the robot to take out a tool T from the tool pot 31 or return a used tool T to the tool pot 31.

The tool pot 31 does not have reinforcing ribs on outer surface of the outer wall 32, so that the outer side 34 of the outer wall 32 has a substantially columnar shape with smooth face. Accordingly, when tools T are exchanged, the tool pot 31 is accurately shifted to match with the center O of the positioning face 51a without hindrance of ribs by applying the positioning face 51a, which is so arcuate to correspond to the outer side 34 of the outer wall 32, to the tool pot 31. Contrarily, if the outer wall 32 is provided with ribs 5c on outer surface, as in the outer wall 5 of the tool pot 1, it would be difficult to locate a tool pot in a predetermined stop position O since the ribs 5c are likely to get caught by an end portion 51b (refer to FIG. 9A) of the positioning block 51.

Therefore, the tool pot 31 of the second embodiment is located in a predetermined stop position O easily and accurately utilizing the smooth outer side 34 of the outer wall 32 having a substantially columnar shape. Although the positioning face 51a of the positioning device 50 of the foregoing embodiment is constructed to be applied to the tool pot 31 from lower side, even if applying direction of the positioning face 51a varies due to change of location of the positioning device 50 and so on, the positioning face 51a can be applied to the outer side 34 of the outer wall 32 from any circumferential direction of the tool pot 31 since the outer side 34 has a substantially columnar shape. This facilitates the positioning of the tool pot 31. Of course, the ribs 37 contribute to weight reduction and reinforcement of the tool pot 31.

Furthermore, the tool pot 1/31 in the preferred embodiments has two-layer construction of the inner wall structure 4 having a tapered portion 2a for supporting the shank portion S, and the outer wall structure 5/32 not supporting the shank portion S directly. With this construction, the inner wall 4 can be arranged to accommodate various tools T only by exchanging the inner wall 4.

Without considering this working-effect, the inner wall 4 may be arranged in entire length of the attachment hole 2 of the tool pot 31.

In addition, in the tool pot 31, the ribs 37 of the outer wall 32 are arranged along axial direction of the outer wall 32, and therefore, the ribs 37 are molded easily without utilizing slide core and so on.

What is claimed is:

1. A tool pot comprising a circumferential wall and having a tool attachment hole, the circumferential wall being made from synthetic resin containing a reinforcing filler,
    the circumferential wall comprising an inner wall structure located in an inner circumference of the attachment hole, at least toward an opening end of the attachment hole and an inner side, and an outer wall structure located around the inner wall structure wherein:
    both of the inner wall structure and outer wall structure are made from thermoplastic resin; and
    a percent by weight of the reinforcing filler of the outer wall structure is higher than a percent by weight of the reinforcing filler of the inner wall structure.

2. The tool pot according to claim 1, wherein a content of reinforcing filler of the inner wall structure is less than 5 weight %, and a content of reinforcing filler of the outer wall structure is within a range of 5 to 60 weight %.

3. The tool pot according to claim 2, wherein the content of reinforcing filler of the outer wall structure is within a range of 15 to 60 weight %.

4. The tool pot according to claim 1, wherein the inner wall structure and outer wall structure are made from the same thermoplastic resin material.

5. The tool pot according to claim 1, wherein the outer wall structure has a plurality of ribs for reinforcement, the ribs being projected only from an inner side of the outer wall structure toward the interior of the attachment hole, and the outer wall structure is substantially columner in outer shape, and is substantially smooth on an outer surface thereof.

6. The tool pot according to claim 5, wherein the ribs are arranged along axial direction of the outer wall.

7. The tool pot according to claim 1, wherein: the inner wall structure comprises a first tapered inner surface, the first tapered surface is located toward the opening end of the tool attachment hole and tapered toward the opening end of the attachment hole correspondingly to a shank portion of a tool inserted into the attachment hole, whereby the shank portion abuts against and is supported by the tapered inner surface; and the outer wall structure comprises a second tapered inner surface defining a deeper side of the attachment hole, and the second tapered surface does not abut against the shank portion.

* * * * *